UNITED STATES PATENT OFFICE.

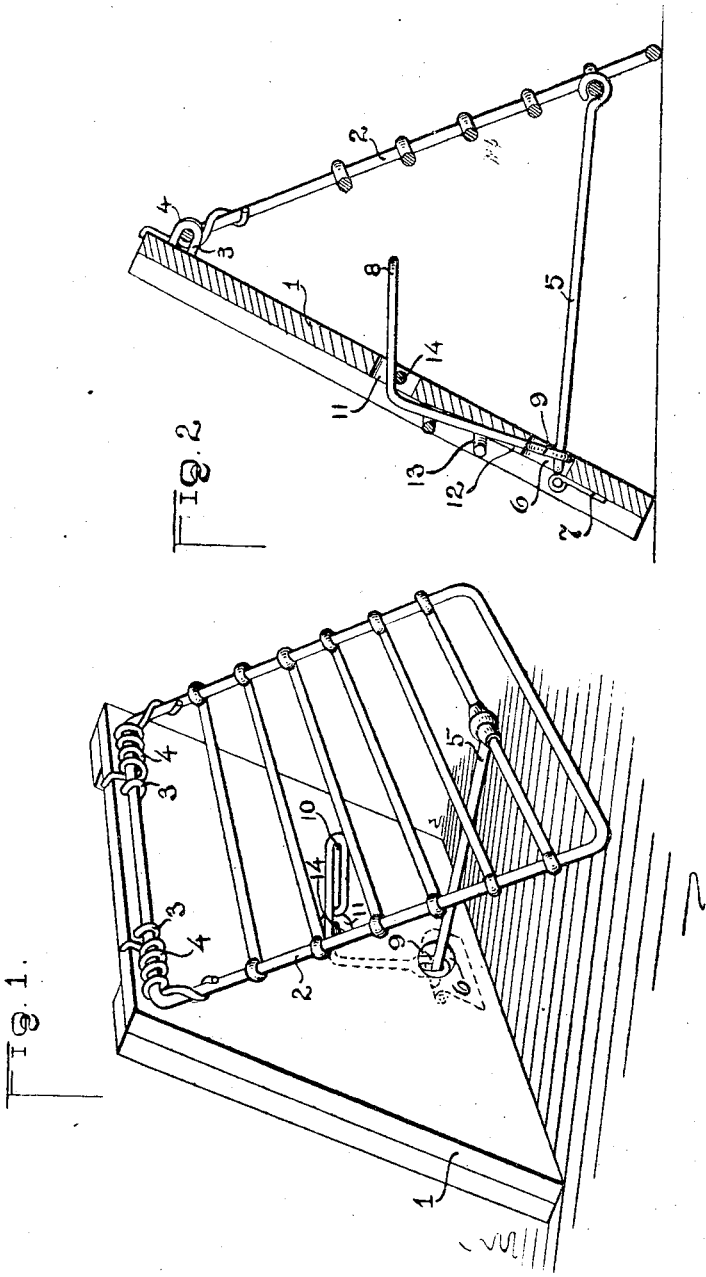

CARL MILLER, OF COLLEGE SPRINGS, IOWA.

RAT OR MOUSE TRAP.

968,966.  Specification of Letters Patent. Patented Aug. 30, 1910.

Application filed March 16, 1910. Serial No. 549,619.

*To all whom it may concern:*

Be it known that I, CARL MILLER, a citizen of the United States, residing at College Springs, in the county of Page and State of Iowa, have invented certain new and useful Improvements in Rat or Mouse Traps; and I do hereby declare the following to be a full, clear, and exact description of the invention, such as will enable others skilled in the art to which it appertains to make and use the same.

My invention relates to new and useful improvements in traps and more particularly to that class adapted to be employed for catching rodents and similar animals and my object is to provide a metal frame and hingedly secure the same to a base.

A further object is to provide means for bringing said frame into engagement with the base with considerable force.

A further object is to provide means for normally holding the frame in an extended position from the base, and, a still further object is to provide a latch for releasing the frame and permitting the same to move into engagement with the base.

Other objects and advantages will be hereinafter referred to and more particularly pointed out in the specification and claims.

In the accompanying drawings which are made a part of this application, Figure 1 is a perspective view of the trap showing the frame in its set or extended position, and, Fig. 2 is a transverse vertical sectional view therethrough.

Referring to the drawings in which similar reference numerals designate corresponding parts throughout the several views, 1 indicates the base of the trap which may be constructed of wood or any suitable substance and adjacent one edge of the base is hingedly secured a frame 2, said frame being preferably constructed of sections of wire engaged with a rectangular frame also formed of wire, the bars of the frame being adapted to engage the animal when the frame is moved into engagement with the base.

Attached to that bar of the frame over which extends staples 3 employed for hinging the frame to the base are coil springs 4, one end of the springs being attached to the base 1, while the opposite ends thereof are engaged with parts of the frame 2 and in position to exert inward tension thereon at all times.

Attached to one of the cross bars of the frame 2 is a pin 5, the outer end being pivotally attached to the cross bar, while the inner end thereof extends through an opening 6 adjacent the lower edge of the base and is so positioned as to rest upon a latch 7 when the frame is in its extended position.

One end of the latch is fixed to the outer face of the base 1, while that end projecting into the path of the opening 6 is rounded or rolled, whereby the end of the pin 5 will readily leave the latch when a pull is made thereon.

The pin 5 is caused to leave the latch 7 through the medium of a bait hook 8, which bait hook is substantially L shaped and the vertical section thereof provided with an eye 9 through which the inner end of the pin 5 extends, while the horizontal portion of the hook is provided with a loop 10 into which is secured the bait.

The horizontal portion of the hook extends inwardly through an opening 11 in the base 1, while the eye 9 enters the opening 6, the outer face of the base 1 having an inclined channel 12 therein which permits the eye 9 to enter the opening 6 and be positioned adjacent the inner edge thereof when the trap is set.

The hook 8 is held in position on the trap in any preferred manner as by means of staples 13, while the vertical portion of the hook is caused to move outwardly to release the end of the pin 5 from the latch 7 by placing a bar 14 laterally through the opening 11 and below the horizontal portion of the hook.

In operation, the free edge of the frame 2 is swung outwardly and the free end of the pin 5 engaged with the rounded portion of the latch 7 and in view of the tension exerted on the frame by the springs 4, the frame will be held in engagement with the latch and the frame supported in its elevated position. The trap is then placed edgewise as shown in Fig. 1 resting upon one edge of the base and free edge of the frame.

Bait of any preferred kind may be engaged with the loop on the horizontal portion of the hook 8 so that when an animal passes between the base and frame and begins pulling at the bait to release the same from the hook, the vertical portion of the hook will be pulled outwardly and upwardly, thus releasing the pin from the latch and permitting the frame to move inwardly. This action will impinge the animal between the frame and base and in view of the pressure of the spring, will in time kill the animal, unless released soon after the trap is sprung.

The hook 8 is caused to release the pin 5 when a pull is made on the bait in view of the fact that when the trap is set, the eye end of the horizontal portion of the hook will be inclined inwardly, while the horizontally extending portion will be inclined upwardly and by placing the bar 14 across the opening through which the horizontal portion extends, the downward movement of the horizontal end will form a pivot on the bar 14 and cause the vertical portion to move outwardly and upwardly.

It will thus be seen that I have provided a very cheap and economical form of trap and one that will be positive in its operation. It will further be seen that the animal can enter the trap from either end and in fact, that one or a number of animals may be entrapped at the same time and it will likewise be seen that in view of the simplicity of the device, the trap can be manufactured at a very nominal expense and is practically indestructible from use.

What I claim is:—

1. In a trap of the class described, the combination with a base, of a frame having one of its edges hingedly secured to said base, springs adapted to direct inward pressure on said frame, a pin pivotally attached to said frame and adjacent its free edge, a latch having a curved end with which said pin engages to hold the free edge of the frame in an extended position, a bait hook having an eye at one end through which the inner end of the pin extends and means to cause an outward and upward movement of the eye section of the hook when a pull is made upon the opposite section thereof.

2. In a trap of the class described, the combination with a base having openings therethrough, of a frame having one of its edges hingedly secured to said base and adjacent one edge of the base, a pin pivotally secured to the frame adjacent its free edge and having its inner end extending through one of said openings, a latch fixed to the base and intersecting the opening through which the pin extends, said latch having a rounded portion with which the end of the pin engages, a bait hook having a vertical and horizontal portion, said vertical portion having an eye through which the pin extends, the horizontal portion of the hook extending through the other opening of the base, means to hold the hook in position on the base and means to cause an outward and upward movement of the horizontal portion when a downward pull is given the horizontal portion of the hook.

In testimony whereof I have signed my name to this specification in the presence of two subscribing witnesses.

CARL MILLER.

Witnesses:
 HAROLD BERRY,
 JOHN COMBE.